US012386853B2

(12) United States Patent
Newman et al.

(10) Patent No.: US 12,386,853 B2
(45) Date of Patent: Aug. 12, 2025

(54) USER INTERFACES FOR DATA TRAVERSAL OF KNOWLEDGE GRAPHS

(71) Applicant: Wells Fargo Bank, N.A., San Francisco, CA (US)

(72) Inventors: David Newman, Walnut Creek, CA (US); Omar B. Khan, Richmond, VA (US); Chao Chen, Short Hills, NJ (US); Nisha Rama Krishnan, San Francisco, CA (US); Matthew R. Ruble, Malvern, PA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/493,346

(22) Filed: Oct. 24, 2023

(65) Prior Publication Data
US 2025/0131011 A1    Apr. 24, 2025

(51) Int. Cl.
*G06F 16/00* (2019.01)
*G06F 16/22* (2019.01)
*G06F 16/248* (2019.01)
*G06F 16/26* (2019.01)

(52) U.S. Cl.
CPC .......... *G06F 16/26* (2019.01); *G06F 16/2228* (2019.01); *G06F 16/248* (2019.01)

(58) Field of Classification Search
CPC ..... G06F 16/26; G06F 16/2228; G06F 16/248
See application file for complete search history.

(56) References Cited

U.S. PATENT DOCUMENTS

| | | | |
|---|---|---|---|
| 11,238,084 B1 * | 2/2022 | Newman | G06F 16/284 |
| 12,169,499 B1 * | 12/2024 | Cannon | G06F 16/248 |
| 2015/0019537 A1 * | 1/2015 | Neels | G06F 16/9535 |
| | | | 707/722 |
| 2015/0212663 A1 * | 7/2015 | Papale | G06F 16/245 |
| | | | 715/762 |
| 2018/0268467 A1 * | 9/2018 | Labarre | G06F 16/9027 |
| 2019/0034540 A1 * | 1/2019 | Perkins | G06F 16/9535 |

(Continued)

OTHER PUBLICATIONS

David Carasso; Search processing Languages (SPL) Primer and Cookbook, 156 pages (Year: 2012).*

*Primary Examiner* — Noosha Arjomandi
(74) *Attorney, Agent, or Firm* — SCHWEGMAN LUNDBERG & WOESSNER, P.A.

(57) ABSTRACT

A method may include presenting a user interface on a computing device, the user interface including: a service provider input element identifying a service provider; a service identifier input element identifying a service; and a graph presentation area; executing a knowledge graph database query using a combination of the service provider and the service as input to a knowledge graph database; receiving tuple results in response to the executing, the tuple results including an allocation value property of the service provider attributable to the service provider with respect to the service; and generating in the graph presentation area, an interactive graph based on the tuple results including: representations of entities including the service provider and the service in the tuple results as nodes in the interactive graph, wherein a representation of the service provider includes the allocation value; and links connecting the representations of entities.

14 Claims, 8 Drawing Sheets

(56) References Cited

U.S. PATENT DOCUMENTS

| | | | | |
|---|---|---|---|---|
| 2019/0303395 | A1* | 10/2019 | Flood | G06F 40/295 |
| 2021/0263898 | A1* | 8/2021 | Lei | G06F 16/9024 |
| 2021/0342541 | A1* | 11/2021 | Taylor | G06F 16/3328 |
| 2021/0406263 | A1* | 12/2021 | Riscutia | G06F 16/2465 |
| 2022/0237185 | A1* | 7/2022 | Portisch | G06F 16/2465 |
| 2023/0071799 | A1* | 3/2023 | Ramnani | G06N 20/00 |
| 2023/0077829 | A1* | 3/2023 | Lee | G06N 20/00 705/7.38 |
| 2024/0378176 | A1* | 11/2024 | Newman | G06F 16/9024 |

* cited by examiner

USER INTERFACES FOR DATA TRAVERSAL OF KNOWLEDGE GRAPHS

Companies may have many subsidiaries and interact with thousands of services. In order to keep track of what services are being provided to which subsidiary a spreadsheet may be used. The spreadsheet may identify other information about a subsidiary or service such as its location, in various examples.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawing.

DETAILED DESCRIPTION

Figure 1:
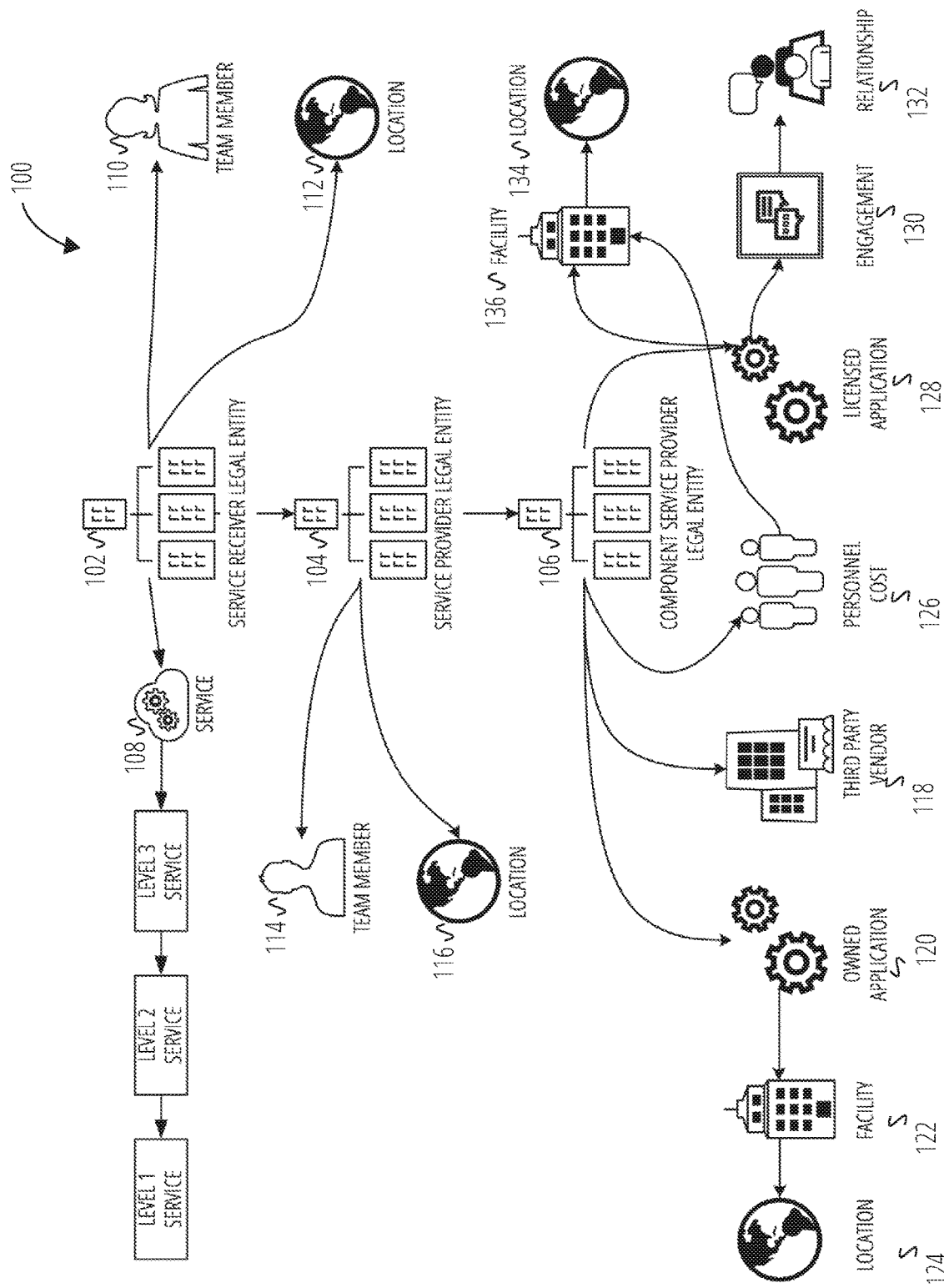
FIG. 1 is an entity link visualization diagram between concepts in a semantic ontology, according to various examples.

In the following description, for purposes of explanation, numerous specific details are set forth in order to provide a thorough understanding of some examples. It will be evident, however, to one skilled in the art that the present invention may be practiced without these specific details.

Throughout this disclosure, electronic actions may be performed by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., Random Access Memory (RAM), cache, hard drive) accessible by the component via an Application Programming Interface (API) or other program communication method. Similarly, the variables may be assumed to have default values should a specific value not be described. User interfaces may be provided for an end-user or administrator to edit the variable values in some instances.

In various examples described herein, user interfaces such as a knowledge graph database visualization, are described as being presented to a computing device. Presentation may include data transmitted (e.g., a hypertext markup language file) from a first device (such as a web server) to the computing device for rendering on a display device of the computing device via a web browser. Presenting may separately (or in addition to the previous data transmission) include an application (e.g., a stand-alone application) on the computing device generating and rendering the user interface on a display device of the computing device without receiving data from a server.

Furthermore, the user interfaces are often described as having different portions or elements. Although in some examples these portions may be displayed on a screen at the same time, in other examples the portions/elements may be displayed on separate screens such that not all of the portions/elements are displayed simultaneously. Unless indicated as such, the use of "presenting a user interface" does not infer either one of these options.

Additionally, the elements and portions are sometimes described as being configured for a certain purpose. For example, an input element may be described as being configured to receive an input string. In this context, "configured to" may mean presentation of a user interface element that is capable of receiving user input. Thus, the input element may be an empty text box or a drop-down menu, among others. "Configured to" may additionally mean computer executable code processes interactions with the element/portion based on an event handler. Thus, a "search" button element may be configured to pass text received in the input element to a search routine that formats and executes a structured query language (SQL) query with respect to a database.

An enterprise (e.g., a company) may have many sub-entities that operate under a main entity. For example, Acme Inc., may have a subsidiary, Little Acme., Inc. For large enterprises, there may be hundreds of such entities. An entity may provide services or receive services (and, sometimes, both). A service provider may use other companies to provide portions (e.g., "components") of the provided services, which may be called component service providers. The failure of even one of the component service providers within a large enterprise may have a ripple effect that causes one or more entities of the enterprise to fail (e.g., become unable to perform its functions).

In addition to the problems that may be associated with a disrupted service, many enterprises are under regulatory rules to maintain their respective functions and document linkages between the associated entities. However, not all entities may be under such rules. Accordingly, some services may be designated as critical, while other service are not so designated. As an extension, service providers and component service providers that support those critical service receivers may also need to be of a higher caliber nature with more robust uptime requirements, and, accordingly, may be designated as material.

One possible solution to the challenges posed by large enterprise organizational structures may include a manual spreadsheet that attempts to manage the linkages between service providers, service receivers, and component service providers. However, this approach has several problems including data integrity, data scalability, and data security. For example, spreadsheets are prone to human error, such as incorrect data entry, accidental deletion, or accidental modification of data. This can lead to inconsistencies in the data and make it difficult to trust and make decisions based on the information in the spreadsheet. Additionally, not all spreadsheets are designed to efficiently handle and run complex analysis on large amounts of data. As the number of legal entities (e.g., service providers and service receivers) and relationships between them increases, the spreadsheet can quickly become unwieldy and difficult to navigate. This may make it hard to find the information needed—as well as increase the chance for data entry errors. Computationally large spreadsheets also require domain expertise to read, write, and understand the underlying data. Domain expertise can become a logistical challenge and enterprise risk when the domain expert is unavailable to process data requests, and contingency measures are not adequate or available.

In addition to the data storage issues, spreadsheets may not have the tools for proper data analysis and visualization. Thus, it may be time-consuming and difficult to extract meaningful insights from the data in a spreadsheet. Similarly, spreadsheets are not often designed to link data across different sheets or workbooks-especially if those spreadsheets are not always network accessible and are in disparate physical locations. This may make it difficult to connect related data and trace relationships between legal entities, which may be important when dealing with complex relationship structures and critical services.

Accordingly, a more robust, accurate, and efficient system for tracking linkages between service providers, service receivers, and component service providers is needed. By using a different data structure, such as a knowledge graph-which is designed to handle large amounts of data and semantically link and analyze data-many of the issues and disadvantages discussed herein may be mitigated. In various examples discussed herein, a legal entity may refer to a business, line of business, division, sub-division, corporation, company, association, organization, group, or other business entity. It is appreciated that in various examples discussed herein, a sub-legal entity may be a legal entity that makes up part of a larger legal entity FIG. 1 is an entity link visualization diagram between concepts in a semantic ontology, according to various examples. FIG. 1 includes concepts of a service receiver legal entity 102, a service provider legal entity 104, a component service provider legal entity 106, a service 108, a team member 110, a location 112, a team member 114, a location 116, a third party vendor 118, an owned application 120, a facility 122, a location 124, a personnel cost 126, a licensed application 128, an engagement 130, a relationship 132, a location 134, and a facility 136.

The diagram in FIG. 1 may be an abstracted conceptual visualization of data linkages of concepts in a semantic ontology. The semantic ontology may be considered a source chain ontology in various examples. The precise names and linkages shown are an example and other names and linkages may be used. A semantic ontology may be a hierarchy of concepts. A concept may have one or more properties and each property may have a value type (e.g., string, number, another concept, etc.). At a high level, a semantic ontology allows for generating triples (also referred to tuples herein) that use a subject-predicate-object (SPO) triple to define the relationships between the concepts. A concept may be represented as an entity type in a knowledge graph (as discussed in more detail below). A particular instance of an entity type may be referred to as an entity or object that is stored in the knowledge graph. The subject and object parts of an SPO triple may both be entities. Accordingly, this document will often use language such as a "ABC entity" or "ABC object" as a manner of identifying a particular entity node of the type "ABC."

The triples may be defined in a standardized format specification such as the resource description framework (RDF). The subject, object, and predicate may be a uniform resource identifier (URI), a value, or resource.

For example, a triple may be:
<(website)/legalentity/serviceprovider#entityname> <(website)/legalentity/serviceprovider#location> "123 Main St."

The above triple may be representative of the SPO triple of "entity name" has a location of "123 Main St". With reference to FIG. 1, service receiver legal entity 102 may be a service provider concept of the triple and location 112 may be the location concept. An extension of RDF is an RDF schema (RDFS), and relatedly the Web Ontology Language (OWL). These define additional syntax vocabularies to allow for more complex relationship definitions for concepts such as classes, subclasses, inheritance, etc. Furthermore, one semantic ontology may link to another entity or import the classes of another base ontology-thereby extending the base ontology.

Entity link visualization 100 may represent the topology of concepts in a service network. As seen, service receiver legal entity 102 may receive (e.g., make use of) service 108. Service receiver legal entity 102 (and service provider legal entity 104) may additionally have one (or more) associated team member 110 entities and associated locations 112 and 116.

A team member entity may correspond to an employee identifier and a location may be an address, in various examples. Service receiver legal entity 102, service provider legal entity 104, and component service provider legal entity 106 may have respective values (not shown in FIG. 1) that correspond to the formal legal name of the corresponding business entity. Service provider legal entity 104 may be a business entity that provides service 108 to service receiver legal entity 102, and component service provider legal entity 106 may be the business entity that provides a component for service 108 to service provider legal entity 104. Service 108 may have additional levels of granularity defined from broadest to narrowest (e.g., from Level 3 to Level 2 to Level 1).

Component service provider legal entity 106 may be associated with many different entities. For example, component service provider legal entity 106 may have an owned application 120 (e.g., an application developed and maintained by that entity, such as a software application) or licensed application 128 (e.g., a third-party application). Either type of application may be hosted by a facility (e.g., facility 122 and facility 136), which in turn have their own locations (e.g., location 124 and location 134). In the instances of licensed application 128, there may be an entity (e.g., engagement 130) that indicates how component service provider legal entity 106 is engaged (e.g., a type of agreement) with licensed application 128 with a subclass of relationship 132. In various examples, component service provider legal entity 106 may utilize a third-party vendor 118. Another entity may store a value of personnel cost 126 (e.g., a percentage of available employee bandwidth/productivity or actual capital expenditures) with respect to component service provider legal entity 106 for service provider legal entity 104.

As indicated above, ontologies may be interconnected. In various examples, the service network ontology as depicted in FIG. 1 may utilize links to a language and country code ontology. Furthermore, it may import (and thus make use of) a corporation specific ontology, which in turn may have imported a subject-matter specific (e.g., medical, financial, educational, etc.) ontology. As previously discussed, FIG. 1 illustrates one example of a visualization of data linkages in an example semantic ontology. The precise names and linkages shown are provided for purposes of explanation, and in various other examples, visualizations may include a variety other names and linkages that are unique and dependent on the particular visualized concepts.

Figure 2:
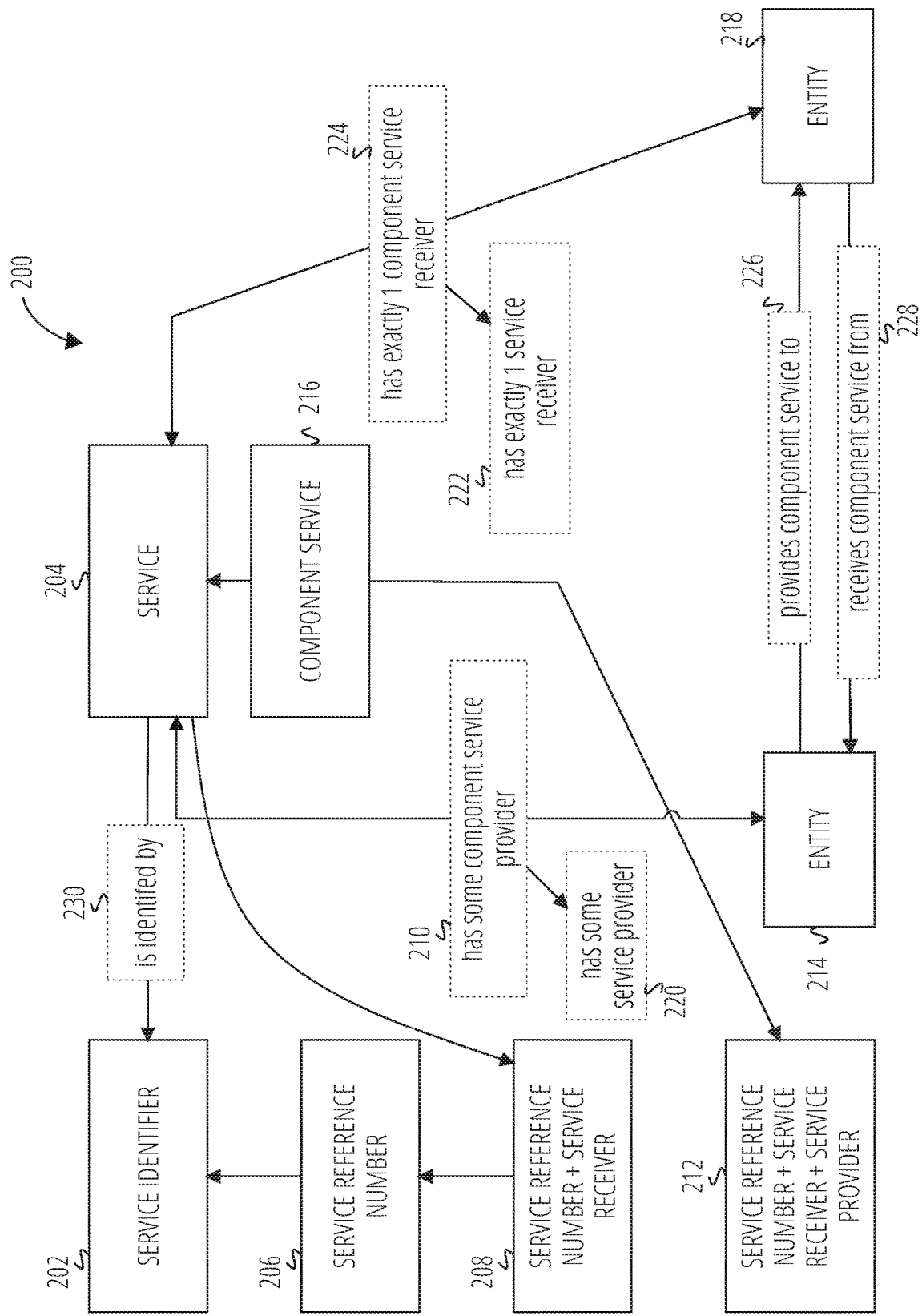
FIG. 2 is a visual representation of an ontology schema, according to various examples.

FIG. 2 is a visual representation 200 of a portion of an ontology schema, according to various examples. Visual representation 200 may be considered the logical definitions that govern an ontology for the entities depicted in the visualization of FIG. 1. FIG. 2 is presented as a subset of a source chain ontology and includes objects 202 to 218 and properties 220 to 230. For example, service object 204 may have a property (property 230) of "is identified by" service identifier object 202. Thus, a triple within a knowledge graph may be of the form <service object, is identified by, service identifier object>.

Furthermore, some of the links of the visual representation 200 are unlabeled. In these instances, it may be assumed there is "has a" property relationship. For example, service receiver object 206 may have a service identifier object 202 and component object 216 may have an object 212. Object 212 may be a concatenation of three identifiers (e.g., service reference number+service receiver+service provider) that originate from a source chain datafile—similarly object 208 is a concatenation of a service reference number and service receiver.

It may also be seen that properties may also link or be associated with other properties. For example, property 224, which links service object 204 and entity object 218, has its own property 222—and similarly object 210 has property 220. One can also observe the reciprocal nature of relationships as object 214 has a "provides component service to" property 228 with respect object 218, and object 218 has a "receives component service from" property 226 with respect to object 214. The precise descriptions and links in visual representation 200 are an example, and other layouts and property labels may be used.

Figure 3:
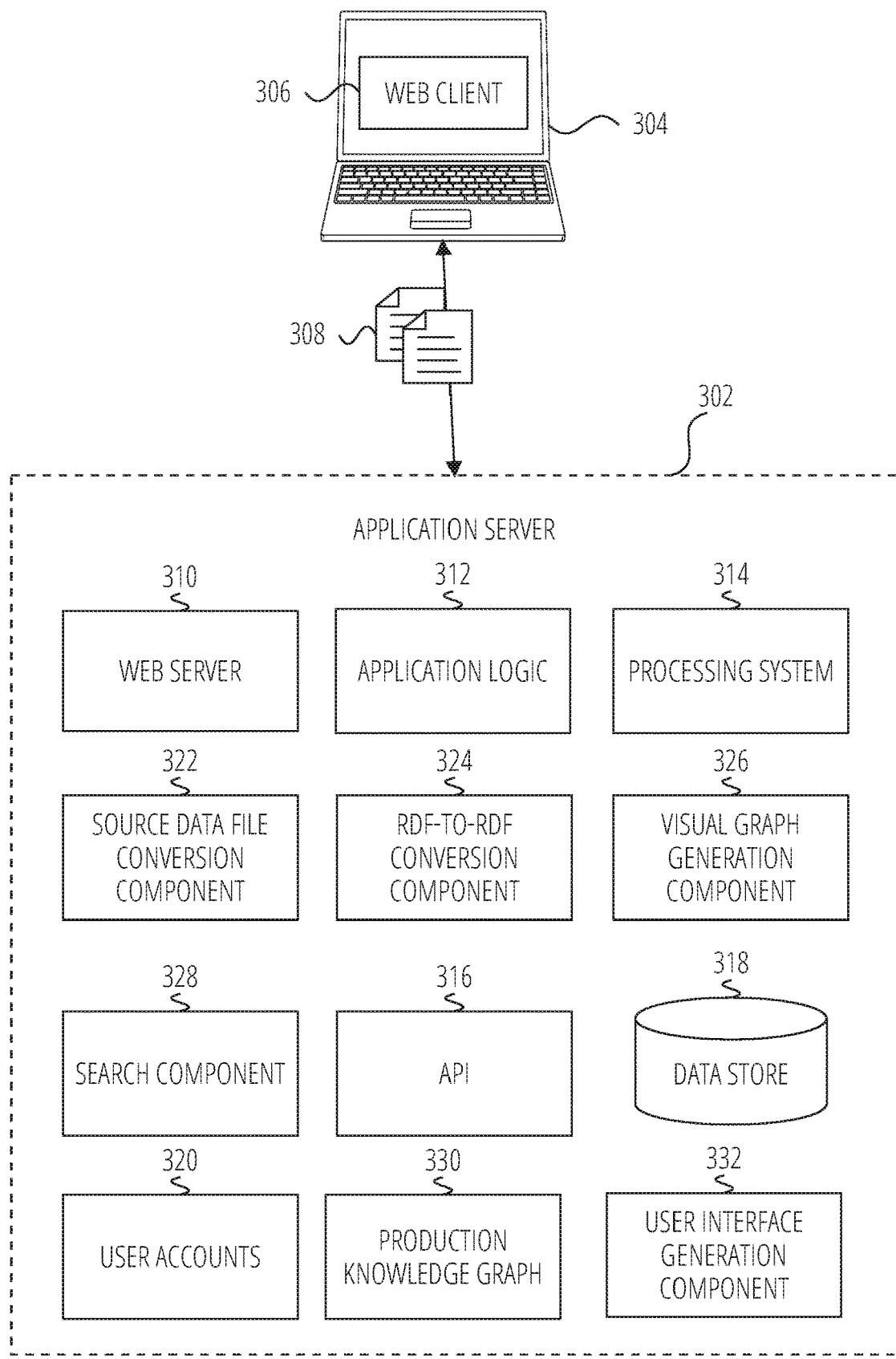
FIG. 3 is an illustration of components of a client device and knowledge graph application server, according to various examples.

FIG. 3 is an illustration of components of a client device and knowledge graph application server, according to various examples. FIG. 3 includes a knowledge graph application server 302, a client device 304, a web client 306, a data 308, a web server 310, an application logic 312, a processing system 314, an API 316, a data store 318, a user accounts 320, a source data file conversion component 322, an RDF-to-RDF conversion component 324, a visual graph generation component 326, a search component 328, and a production knowledge graph 330.

Knowledge graph application server 302 is illustrated as set of separate elements (e.g., components, etc.). However, the functionality of multiple, individual elements may be performed by a single element. An element may represent computer program code that is executable by processing system 314. The program code may be stored on a storage device (e.g., data store 318) and loaded into a memory of the processing system 314 for execution. Portions of the program code may be executed in a parallel across multiple processing units (e.g., a core of a general-purpose computer processor, a graphical processing unit, an application specific integrated circuit, etc.) of processing system 314. Execution of the code may be performed on a single device or distributed across multiple devices. In various examples, the program code may be executed on a cloud platform (e.g., MICROSOFT AZURE® and AMAZON EC2®) using a shared computing infrastructure.

Furthermore, several functions are discussed as being performed on knowledge graph application server 302 such as data ingestion, data processing, graph manipulations, visualizations, etc. As with the individual elements, these functions may be performed by one or more other servers. For example, one server may primarily be used for responding to visualization requests, and another server may primarily be used for responding to database queries.

Client device 304 may be a computing device which may be, but is not limited to, a smartphone, tablet, laptop, multi-processor system, microprocessor-based or programmable consumer electronics, game console, set-top box, or another device that a user utilizes to communicate over a network. In various examples, a computing device includes a display module (not shown) to display information (e.g., in the form of specially configured user interfaces). In some examples, computing devices may comprise one or more of a touch screen, camera, keyboard, microphone, or Global Positioning System (GPS) device.

A user may use a device such as client device 304 for a variety of purposes with respect to knowledge graph application server 302. For example, a data scientist may use client device 304 to edit an ontology (e.g., add properties of concept types, add new concepts, etc.). Another user may use client device 304 to query production knowledge graph 330 for a service and see the cost impact on an enterprise should the service go down. Yet another user may use client device 304 to look at inferred relationships between server receivers and service providers and confirm if the relationship is real. Another use case may be to examine the cost attributable to component providers with respect to a service provider and service. Other use cases may be determined by a person having ordinary skill in the art upon review of this disclosure.

Client device 304 and knowledge graph application server 302 may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks, or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet.

In various examples, the communication may occur using an application programming interface (API), such as API 316. An API provides a method for computing processes to exchange data. A web-based API (e.g., API 316) may permit communications between two or more computing devices such as a client and a server. The API may define a set of HTTP calls according to Representational State Transfer (RESTful) practices. For examples, A RESTful API may define various GET, PUT, POST, DELETE methods to create, replace, update, and delete data stored in a database (e.g., data store 318). For example, a user may activate a user interface (UI) element to initiate a search of a particular service receiver. In response, an API call may be generated that includes a JavaScript Object Notation (JSON) payload with a service receiver identifier. Knowledge graph application server 302 may receive the API call and, using search component 328, generate and issue a query to data store 318 for information on the service receiver and transmit the query results back to client device 304 for display. Another API call may be used to retrieve cost allocation data for service providers and service receivers with respect to a service.

Knowledge graph application server 302 may include web server 310 to enable data exchanges with client device 304 via web client 306. Although generally discussed in the context of delivering webpages via the Hypertext Transfer Protocol (HTTP), other network protocols may be utilized by web server 310 (e.g., File Transfer Protocol, Telnet, Secure Shell, etc.). A user may enter in a uniform resource identifier (URI) into web client 306 (e.g., the INTERNET EXPLORER® web browser by Microsoft Corporation or SAFARI® web browser by Apple Inc.) that corresponds to the logical location (e.g., an Internet Protocol address) of web server 310. In response, web server 310 may transmit a web page that is rendered on a display device of a client device (e.g., a mobile phone, desktop computer, etc.).

Additionally, web server 310 may enable a user to interact with one or more web applications provided in a transmitted web page. A web application may provide user interface (UI) components that are rendered on a display device of client device 304 using user interface generation component 332. The user may interact (e.g., select, move, enter text into) with the UI components, and based on the interaction, the web application may update one or more portions of the web page. A web application may be executed in whole, or in part, locally on client device 304. The web application may populate the UI components with data from external sources or internal sources (e.g., data store 318) in various examples. In various examples, the web application is a dynamic user interface that provides several ways to view and analyze data stored in production knowledge graph 330 such as cost allocation data. These views and associated functionality are described in more detail with respect to the remaining figures.

The web application may be executed according to application logic 312. Application logic 312 may use the various elements of knowledge graph application server 302 to implement the web application. For example, application logic 312 may issue API calls to retrieve or store data from data store 318 and transmit it for display on client device 304. Similarly, data entered by a user into a UI component may be transmitted using API 316 back to the web server. Application logic 312 may use other elements (e.g., source data file conversion component 322, RDF-to-RDF conversion component 324, visual graph generation component 326, etc.) of knowledge graph application server 302 to perform functionality associated with the web application as described further herein.

Data store 318 may store data that is used by knowledge graph application server 302, such as production knowledge graph 330 and user profiles of user accounts 320. Data store 318 is depicted as a singular element but may in actuality be multiple data stores. The specific storage layout and model used in by data store 318 may take a number of forms-indeed, a data store 318 may utilize multiple models. Data store 318 may be, but is not limited to, a relational database (e.g., SQL), non-relational database (NoSQL) a flat file database, object model, document details model, graph database, shared ledger (e.g., blockchain), or a file system hierarchy. Data store 318 may store data on one or more storage devices (e.g., a hard disk, random access memory (RAM), etc.). The storage devices may be in standalone arrays, part of one or more servers, and may be located in one or more geographic areas.

User accounts 320 may include user profiles on users of knowledge graph application server 302. A user profile may include credential information such as a username and hash of a password. A user may enter in their username and plaintext password to a login page of knowledge graph application server 302 to access and view their user profile information or interfaces presented by knowledge graph application server 302 in various examples.

A user account may also include preferences of the user. The preferences may include default views and default graph visualization options, which may be configurable (e.g., customizable). For example, a user may set the default levels (e.g., the number of links to follow down a graph database) of a visualization to three and set the view to be a service receiver network view. The user account may also identify a role of the user. Different users may have different access rights with respect to data stored in production knowledge graph 330. For example, a data scientist may be able to edit a schema of an ontology, while another user may be able to view service receiver links, but not view information on what service providers are considered material. In various examples, different access rights for the described operations or data stored in the production knowledge graph (e.g., read, write, modify, delete) provides an advantage and an improvement in security and efficiency. For instance, it gives an organization control to regulate a production knowledge graph to ensure users are genuine about their identity and have the proper amount of trust to perform actions.

Certain roles (e.g., an accounting role) may enable other user interface panes to be displayed to view cost allocation values with respect to service providers and service providers. For example, user interface generation component 332 may present specialized interfaces that are configured to present the cost allocation values as part of a graph visualization as well as part of panel interface presented alongside the graph visualization (as discussed in more detail below in FIG. 6.)

Figure 4:
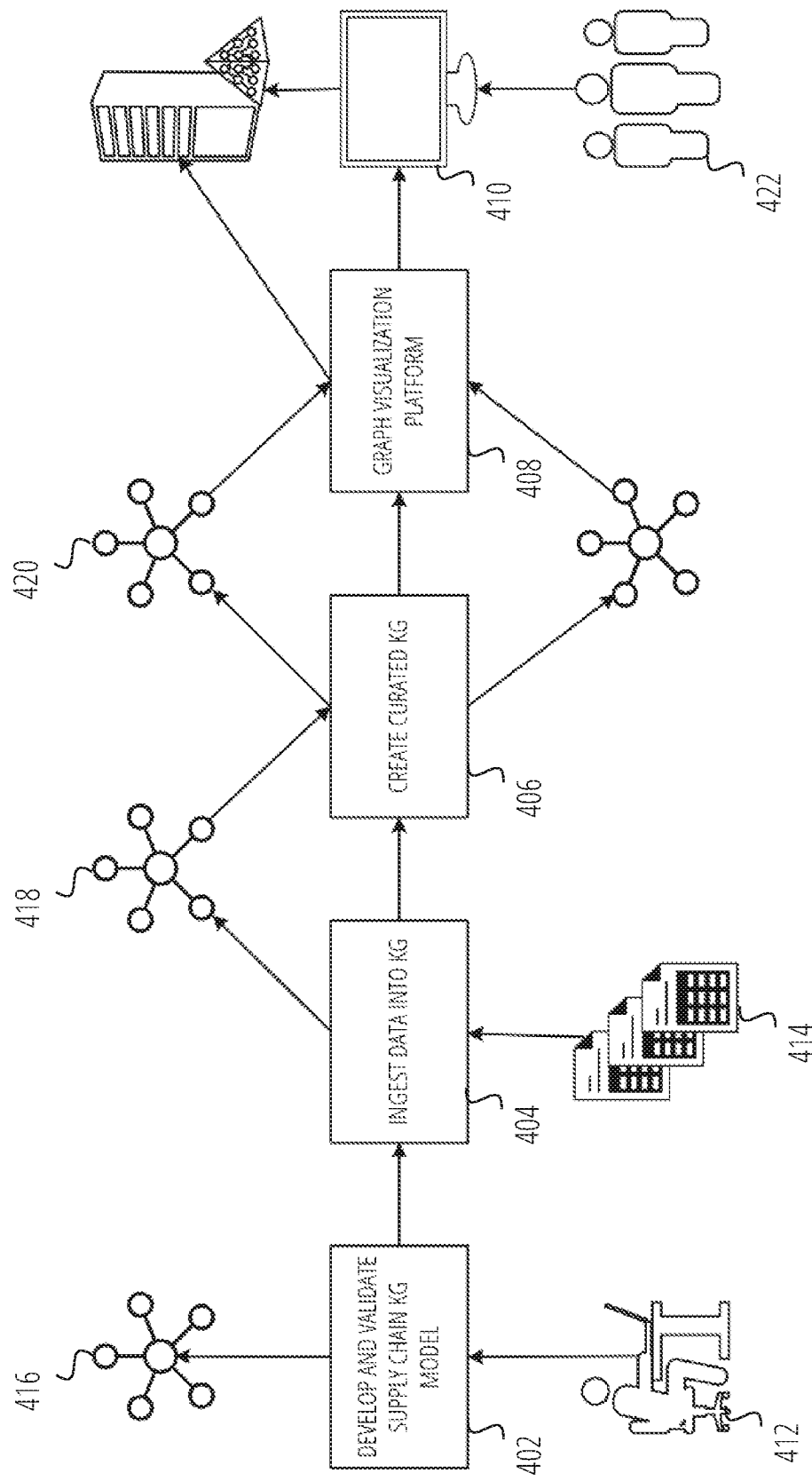
FIG. 4 is a process diagram of generating a knowledge graph database, according to various examples.

FIG. 4 is a process diagram of generating a knowledge graph database such as production knowledge graph 330, according to various examples. FIG. 4 is illustrated as including a develop and validate operation 402, an ingestion operation 404, a curate graph operation 406, a visualization platform 408, a display device 410, data scientist users 412, input data sources 414, a source chain ontology 416, a raw source chain graph 418, a curated source chain graph 420, and end users 422. The operations described with respect to FIG. 4 may be performed by a computing device such as knowledge graph application server 302. For example, ingestion operation 404 may be performed by source data file conversion component 322, curate graph operation 406 may be performed by RDF-to-RDF conversion component 324, and the visualization platform 408 may be implemented by visual graph generation component 326.

As an initial matter, data scientist users 412 may generate a schema, referred to herein as source chain ontology 416. Source chain ontology 416 may be generated in several formats. A schema for an ontology is a set of rules and guidelines that define the structure, content, and relationships of the classes, properties, and individuals (e.g., people, businesses, objects) in the ontology. The schema may provide a formal specification of the ontology that may be used to guide the development, maintenance, and use of the ontology by applications. For example, the schema may describe the concepts in FIG. 1.

The schema for an ontology may be expressed in various ways. For example, in OWL, the schema for an ontology may be expressed using OWL constructs, such as class and property axioms, restrictions, and annotations. In RDF, the schema for an ontology may be expressed using RDF vocabularies, such as RDFS (RDF Schema) and OWL, and may include definitions of classes, properties, and datatypes, as well as other metadata and documentation. Within the context of source chain ontology 416, the schema may identify the various entity type classes such as a service receiver, service provider, component service provider and relationships between such classes. The schema may be based in part on an existing data source (e.g., input data sources 414) such as column headings in a spreadsheet or tables of a relational database. As an example, here is what a Person class and an Organization class may approximately look like in OWL:

Class: ex: Person
      SubClassOf: owl:Thing
      EquivalentTo:
        hasFirstName some xsd:string
        hasLastName some xsd:string
    Class: ex:Organization
      SubClassOf: owl:Thing
      EquivalentTo:
        hasName some xsd:string
        hasAddress some ex:Address
        hasEmployee only ex:Person
    ObjectProperty: ex:hasEmployee
      Domain: ex:Organization
      Range: ex:Person Ingestion operation 404 may convert the data in input data sources 414 to raw source chain graph 418. Depending on the format of input data sources 414, different algorithms may be executed by source data file conversion component 322 (e.g., as discussed with respect to FIG. 3). For example, if an input source is a spreadsheet in an XLS format, XLS2RDF may be used whereas if an input source is a relational database table, SQL2RDF may be used.

Input data sources 414 may include one or more spreadsheets (e.g., source chain datafiles) that include data identifying properties and links between services, providers, and receivers. The spreadsheets may include several columns. For example, a portion of the spreadsheets may be for service providers and include columns such as "Provider Legal Entity ID" and "Provider Legal Entity Name." A service receiver portion may have columns for "Receiver Legal Entity ID" and "Receiver Legal Entity Name."

Several more columns may be in the spreadsheet that identify locations of the service receivers and service providers and relationship types of the service providers (e.g., inter-company relationship, external relationship, etc.). Service information may also be included in the spreadsheets and include a "Service ID" column and associated information for each legal entity (e.g., location, identifiers, etc.). Accordingly, if one were to read a row it may be determined that for a given service ID, there is a provider legal entity and a receiver legal entity, and component service providers.

Another column may include a classification property, if applicable. For example, services may be classified as "critical" or "non-critical," service providers and component providers may be classified as either "material" or "non-material," and components may be classified as either "essential" or "non-essential." In various examples, the absence of a value may signify the service, service provider, etc., does not have the associated property. Thus, if a criticality column (e.g., to classify a service) does not have a value for a service, it may be assumed that the service is non-critical. . . . Similarly, if a materiality column (i.e., to classify a service provider and component provider) does not have a value for a service provider and component provider, it may be assumed that the service provider and component provider is non-material. Also, if an essential classification column (i.e., to classify a component) does not have a value for a component, it may be assumed that the component is not essential.

The resulting raw source chain graph 418, after ingestion operation 404, may be a graph database that is full of triples based on the data in input data sources 414. The data may be considered raw as it does not yet conform to the source chain ontology 416. Instead, the identification of objects in raw source chain graph 418 may be based on the column headings in input data sources 414. Accordingly, if a heading was "SR_ID" for service receiver ID and "SR_NM" for the service receivers legal name a property may be <SR_ID, has a, SR_NM>. While this may be technically correct, SR_ID may not appear in source chain ontology 416. Accordingly, a further operation (e.g., curate graph operation 406) may be used to translate raw source chain graph 418 to curated source chain graph 420.

For example, RDF2RDF scripts may be executed that include mappings between the object types, properties, etc., used in raw source chain graph 418 to the source chain ontology 416. Accordingly, triples that conform to source chain ontology 416 may be generated based on the triples in raw source chain graph 418. Furthermore, not all of the data that is in raw source chain graph 418 may be needed in curated source chain graph 420. Accordingly, the scripts may also specify what data to map and what data to ignore. Thus, the resulting curated source chain graph 420 may conform to source chain ontology 416 and be smaller in size (e.g., in bytes) than raw source chain graph 418—thereby saving storage space and increasing the speed of querying.

An additional aspect of curated source chain graph 420 is the inclusion of a graph link type. Graph link types may be classified as either inferred or explicit, in various examples. An explicit graph link type may be one in which the source chain datafile does not have missing link data. For example, if there is a service provider in the source chain datafile there should be an identified link to a component provider somewhere in the source chain datafile. If there is, the graph link type may be explicit. If, however, there is a missing link, scripts may be executed to determine an inferred link between a service provider and component provider (or other missing relationship type).

In various examples, another input data source may be a cost allocation data source. The cost allocation data source may correlate to a source chain datafile in that the service providers, service receivers, etc., share the same identifiers as a source chain datafile. Accordingly, cost allocation data may be added as properties of the entities in curated source chain graph 420. For example, a server provider may have a cost allocation value for each service that is associated with the service provider in curated source chain graph 420. Similarly, service receivers may have cost allocations values with respect to the service provider and service.

Curated source chain graph 420 may be used by visualization platform 408 to respond to queries and generate graph visualizations for client devices. For example, end users 422 may login to visualization platform 408 and request the service provider for a service. Visualization platform 408 may query curated source chain graph 420 and generate a graph visualization for display device 410.

Users may interface with a production knowledge graph—production knowledge graph 330—in several manners. For example, a user may search for entity types that are stored in the production knowledge graph such as service receivers, service providers, component objects, licensed applications, etc. The results of the search may be presented as graphical representations of entities (e.g., nodes) and links (e.g., properties) between them in a graph presentation area on a display device of a client device (e.g., via web client 306). Depending on the searched for type of entity, the hierarchy of the results may differ. For example, if a service provider is searched, the head node of a presented graph may be a service provider and the relationships with child nodes may be described with respect to the service provider. If a component object is searched, the component may be the head node and the relationships with child nodes may be described with respect to the component.

Figure 5:
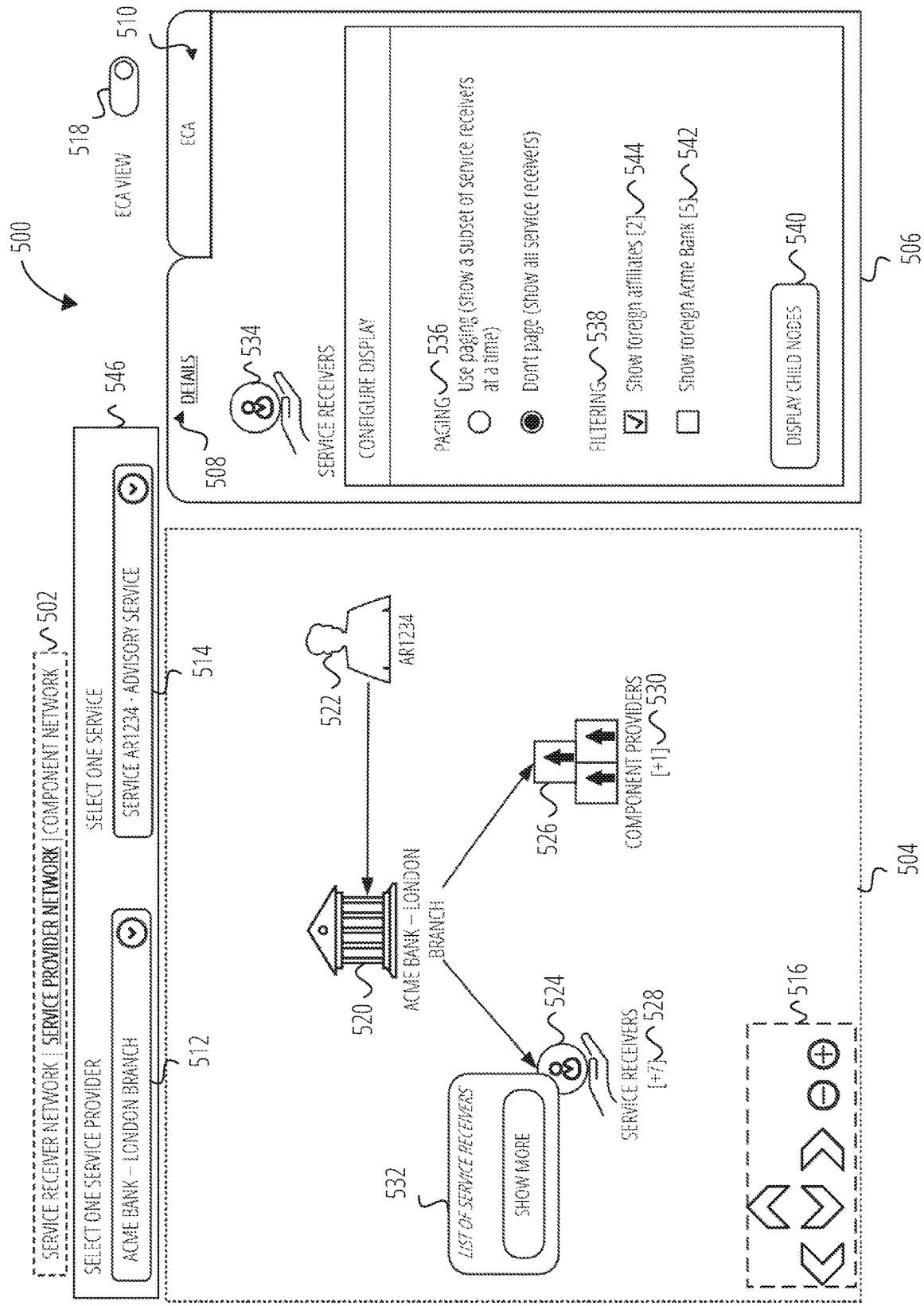
FIG. 5 is a graph visualization user interface, according to various examples.

FIG. 5 is a graph visualization user interface, according to various examples. The user interface 500 comprises a network graph selection type 502, a graph presentation area 504, a contextual panel interface 506, a details tab interface 508, an ECA tab interface 510, a service provider input element 512, a service identifier input element 514, a graph controls 516, an ECA toggle 518, a service provider object 520, a service object 522, a service receivers group object 524, a component providers group object 526, a child element count 528, a child element count 530, an overlay panel interface 532, a selected object representation 534, a paging option controls 536, a filtering option controls 538, a filter service receiver input element 540, a service receiver subgroup 542, a service receiver subgroup 544, and a search toolbar 546. The description of FIG. 5 is discussed in the context of use of elements of knowledge graph application server 302 such as visual graph generation component 326, search component 328, and production knowledge graph 330.

Network graph selection type 502 identifies some of the different types of graphs that may be presented in graph presentation area 504. The types of graphs may use the same underlying knowledge graph in various examples, such as production knowledge graph 330. The type of graph may refer to the perspective on which the graph is visualized in graph presentation area 504, and what search input elements are included in search toolbar 546. For example, the underlined text of "Service Provider Network" in network graph selection type 502 indicates that the interface is currently configured to search for and present a graph from the perspective of a service provider in graph presentation area 504. A user may select another graph type (e.g., "Service Receiver Network" or "Component Network") to be taken to a corresponding search interface for the selected graph type.

Knowledge graph application server 302 may store data on a number of graph types. As part of this storage, a graph type may include configuration data and presentation data for the graph type. The configuration data may identify the entity types at each level of the graph and what queries to execute to retrieve the entities.

The number of levels, as further discussed below, are provided as an example, and others may be used in other examples. The configuration data of a service provider network graph type may identify a service provider legal entity as the head node with child nodes of service receivers and component providers. In order to maintain a more usable graph, a service receiver group node and component provider group node may be used as the immediate child nodes of the service provider. A user may then expand the service provider network by clicking (e.g., using an input device such as a mouse, or a finger when using a touch-enabled display device) either of those child group nodes to display service receivers and component providers, respectively. Accordingly, when a service provider search is requested, a graph database query (e.g., SPARQL or Cypher query) may be executed that retrieves service receivers for a selected service with respect to the service provider, and component providers to the service provider for a selected service. The presentation data may include what icons to use for which types of objects and the style (e.g., color, thickness, solid, dotted, etc.) of the links between objects.

There may be several other types of graph types, such as a service receiver, a component network, and a service network. For example, for a service receiver network graph type, the configuration data may identify the head node as a legal entity that receives a service, a second level being a service provider, and a subsequent level being component providers.

In various examples, the configuration data for a component network graph type may use a legal entity of a component provider as the head node, a service provider object that uses the component provider at the second level, service identifiers at a third level, regions (e.g., geographic regions) at a fourth level, and those entities that use the service in the region in a fifth level. A service network graph type may use a service identifier at the head node, a legal entity object at the second level, and service relationships and components at a third level.

The configuration data may also indicate what search fields are presented in search toolbar 546. For example, for the service receiver network, there may be a service receiver input element and a service identifier input element. For a service provider network graph type, there may be service provider input element 512 and service identifier input element 514. A component network graph type may have a single input element for the component name.

Service provider input element 512 may be configured to receive an input string from a user for a legal name of a service provider. After the input string is entered, search component 328 may be used to execute a query to production knowledge graph 330 to find matching service providers using literal string matching, fuzzy matching, similar matching using Levenshtein distance, etc. This query—and others described herein—may be made using SPARQL queries or another graph database language. Then, service identifier input element 514 may be populated (e.g., in a drop-down menu) of the top 10 (or top 5, top 25, or other top number in other examples) matched service provider objects. In the instance of FIG. 5, the "Acme Bank-London Branch" legal identifier has been selected.

After the service provider has been selected in the service provider input element 512, a subsequent query may be executed to production knowledge graph 330 for services provided by the selected service provider (e.g., in FIG. 5, Acme Bank-London Branch). Based on the results, service identifier input element 514 may be populated with service identifier objects, and one may be selected. In the example of FIG. 5, the service identifier "Service AR1234" has been selected. After both a service provider and service identifier have been selected, another query may made to production knowledge graph 330 for entity objects in the source chain of the service provider with respect to the selected service.

The graph may be presented in several manners by visual graph generation component 326. Separately from the graph type in graph type selector network graph selection type 502, a user may select visualization and layout options. For example, a graph layout selection element (not shown) may present an option to present a tabular view of the results instead of the presented visual graph that includes graphical representations of entities as nodes, etc. Other visualization options may include graph controls 516 to zoom and pan around the graph, or an option to turn on or off edge labels (not shown) that identify the relationship between nodes. Different graph visualization platforms may be used to generate the nodes in graph presentation area 504 (e.g., Neo4j Bloom or Gephi). A user may interact with the nodes in graph presentation area 504 in several manners. For example, a user may move the nodes by performing a click-hold-drag operation using an input device such as a mouse or a finger when using a touch-enabled display device. As a user moves a node, the edges connected to the node may move as well.

As discussed above, there may be a variety of visualization enhancements with respect to knowledge graph visualizations. The enhancements may generally be segmented into two types: graph options and user interface panels. For example, graph options may include presenting link properties on the links between nodes or changing the styles of links in graph presentation area 504 with respect to the visualization of entity types and their links (e.g., an inferred link between entities may use a different color or dash style). User interface panes may present additional information related to what object is being interacted with in graph presentation area 504.

For example, overlay panel interface 532 may be presented when a user uses an input device to hover over service receivers group object 524. Overlay panel interface 532 may include an option to show additional information about the hovered over object. A user may also click (e.g., using an input device such as a mouse, or a finger when using a touch-enabled display device) an object in graph presentation area 504 to display the overlay panel. In the case of FIG. 5, upon clicking the "show more" button, details tab interface 508 may be updated to include information related to service receivers group object 524. Details tab interface 508 may part of a multi-tab contextual panel interface 506. Although contextual panel interface 506 is shown as including two tabs, more or fewer tabs may be used. For example, instead of tabs, a single scrollable interface pane may be used.

Details tab interface 508 illustrates selected object representation 534, which in this example corresponds to the same icon representation of service receiver group object 524. Additionally, textual panel interface 506 also includes a portion to configure the display of graph presentation area 504. The configuration portions include paging option controls 536 and filtering option controls 538.

Paging may be used when the number of objects that are currently displayed in graph presentation area 504 become too many or too complex to reasonably view at the same time (e.g., due to the limited visual landscape (e.g., screen size) of most display devices). Accordingly, when paging is enabled, visual graph generation component 326 generates subgroups, and presents directional navigation controls (e.g., left and right controls) to navigate through the subgroups. The number of objects in a subgroup may be based on a display resolution (e.g., screen width in pixels divided by 100).

For example, if service receivers group object 524 had fifty (50) child objects, when that group is expanded (e.g., by a user clicking child element count 528), it would likely be too many to view concurrently. Accordingly, visual graph generation component 326 may divide the service receivers among multiple navigable pages, such as five pages—each with ten service receivers. Upon selecting a right user interface control (not shown), the next ten may be displayed. As a user navigates through the pages by repeatedly selecting the right user interface control or left user interface control (also not shown), the display of the objects at higher levels may remain as presented. For example, service receivers group object 524 and service provider object 520 may still be displayed on each page.

In various examples, details tab interface 508 may also include a portion to switch between graph types. For example, consider that a user selects a particular service receiver (e.g., a child object of service receivers group object 524). As the graph type is a service provider network, an option to generate a service receiver graph type may be presented in details tab interface 508. When a user selects the option, graph presentation area 504 may be regenerated as a service receiver graph with the selected service receiver as the head node.

Filtering option controls 538 may be used as another manner to limit the number of objects displayed in graph presentation area 504. The presented filter options may correspond to categories (as defined in production knowledge graph 330) of a selected object in graph presentation area 504. For example, in the context of FIG. 5, the filtering options correspond to service receivers group object 524. The total number of child objects is represented in graph presentation area 504 by child element count 528—which includes seven child objects ("+7") in this instance. As another example, component providers group object 526 indicates a single child node ("+1") as represented by child element count 530.

The filtering control options may represent the various categories of the child objects. For example, details tab interface 508 indicates two categories-service receiver subgroup 544 ("Show foreign affiliates [2]") and service receiver subgroup 542 ("Show foreign Acme Bank [5]"). Each subgroup includes an identification and a bracketed number representing the number of child objects within the subgroup. For example, service receiver subgroup 544 has two objects ("[2]"), whereas service receiver subgroup 542 has five objects ("[5]"). A user may select or deselect the various subgroups and activate filter service receiver input element 540 to show or hide the child nodes according to the filtering option(s) selected.

Estimated cost allocations (ECAs) tab interface 510 may illustrate estimated cost allocations for a service provider and its affiliated service receivers. The concept of ECA is discussed in more detail with respect to FIG. 6.

In various examples, ECA tab interface 510 is shown if a user role or identifier has been authorized to use the ECA interface. Knowledge graph application server 302 may store access control lists (ACLs) with respect to various visualization options. An ACL may identify an option and a list of roles or user identifiers that are authorized to use the option. Alternatively, or in addition to an ACL, a user profile may identify the options the user is authorized to use. For example, in order to view ECA toggle 518 and ECA tab interface 510, either the role of a user or user identifier in user accounts 320 should be included in an ACL with respect to viewing ECAs.

In addition to using search toolbar 546 or a graph link in details tab interface 508, a user may arrive at graph presentation area 504 from a report interface. Although not illustrated, user interface 500 may include a tab or link to navigate to the report interface. The report interface may include a drop-down menu of stored results of graph searches of production knowledge graph 330. For example, the menu may include an item of "Service Providers with no Component Providers and Components" or "Non-Material Component Service Providers for Material Entities Receiving Critical Services." Upon selection of an item in the menu, the results of the search may be presented with links to display a graph. For example, for the "Service Providers with no Component Providers and Components" item, a row in a table may be presented that includes a matching service provider with a link to generate and display a service provider network graph with respect to the matching service provider.

Figure 6:
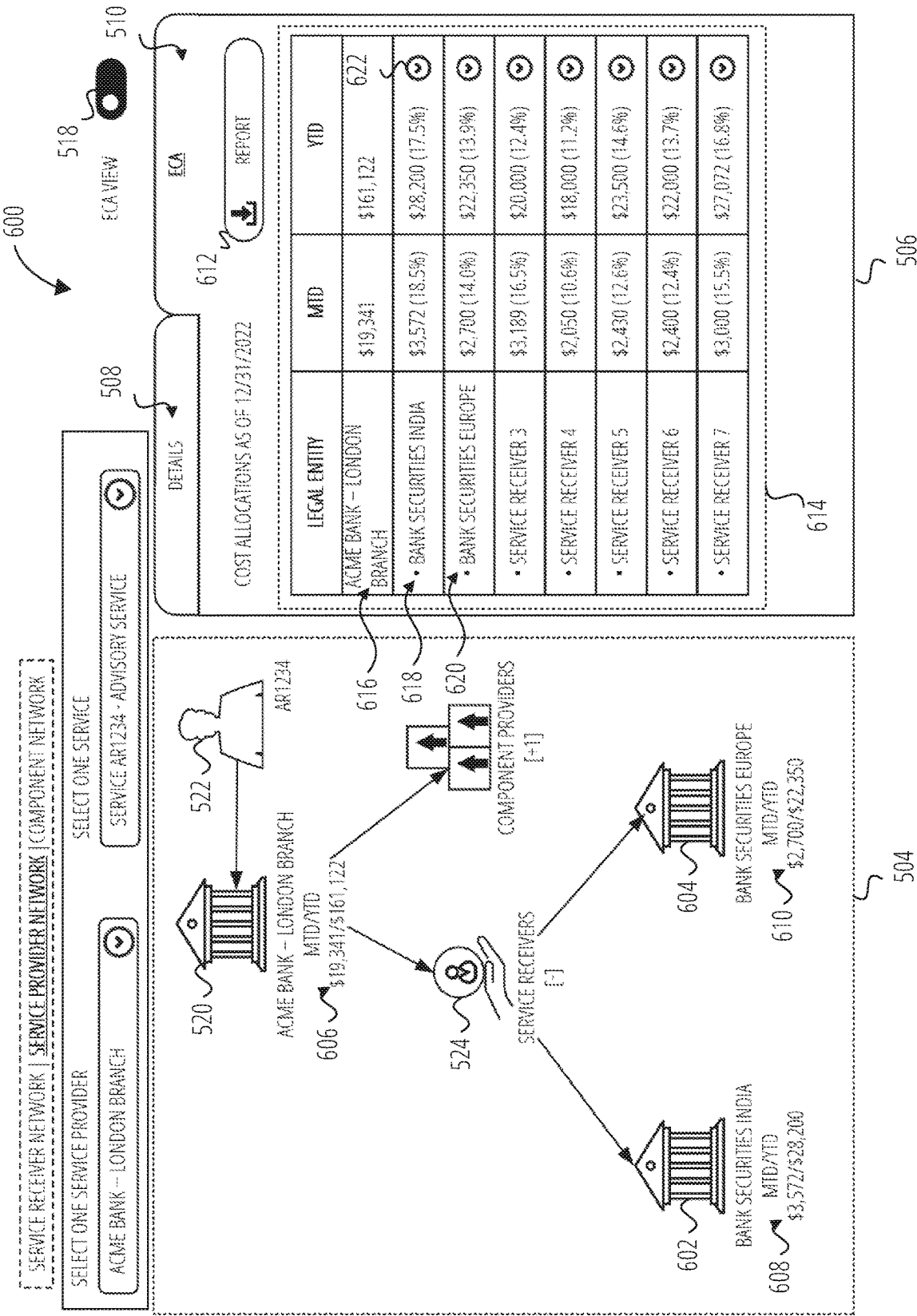
FIG. 6 is a graph visualization user interface, according to various examples

FIG. 6 is a graph visualization user interface, according to various examples. The user interface 600 comprises a graph presentation area 504, a contextual panel interface 506, a details tab interface 508, an ECA tab interface 510, an ECA toggle 518, a service provider object 520, a service receivers group object 524, a service receiver object 602, a service receiver object 604, a Service provider allocation value 606, a Service receiver allocation value 608, a service receiver allocation value 610, a report generation element 612, an ECA table 614, a service provider row 616, a service receiver row 618, service receiver row 620, and an extra detail element 622. FIG. 6 also illustrates elements that were previously discussed above in the context of FIG. 5. Consequently, in various examples, FIG. 6 may be considered a continuing discussion of FIG. 5 but with ECA tab interface 510 selected instead of details tab interface 508.

User interface 600 may be displayed in response to a user activating filter service receiver input element 540 with service receiver subgroup 544 selected and service receiver subgroup 542 not selected (as illustrated, for example, in FIG. 5). Furthermore, after activating filter service receiver input element 540, a user may have switched on ECA toggle 518 and clicked ECA tab interface 510.

In response to activating filter service receiver input element 540, two additional objects are displayed in graph presentation area 504, service receiver object 602 and service receiver object 604. In response to toggling on ECA toggle 518, service provider allocation value 606, service receiver allocation value 608, and service receiver allocation value 610 may be displayed. In various examples, when a user is viewing ECA tab interface 510, the allocation values (e.g., service provider allocation value 606, service receiver allocation value 608, and service receiver allocation value 610) are automatically presented in graph presentation area 504.

An allocation value may be a property of a service receiver object of service provider object stored in production knowledge graph 330 with respect to a service. A single service provider, or service receiver object, may have multiple allocation values that cover different periods (e.g., January to April) or lengths of time (the past six months). For example, there may be a month-to-date allocation value and a year-to-date allocation value.

An allocation value may represent the amount of money that a service provider is responsible for, with respect to a service. For example, service provider object 520 is responsible for $19,341 for the past month, and responsible for $161, 122 for the past year. Thus, for financial planning purposes, a user may quickly ascertain, by looking at the graph in graph presentation area 504, how much money should be allocated to "ACME Bank-London Branch" (e.g., service provider object 520) for providing service AR1234 (service object 522)—as well as potentially predict future allocations. Furthermore, each illustrated allocation value of a service receiver indicates what portion of the service providers allocation value the service receiver is responsible for. For example, service receiver object 602 is responsible for $3,572 of the $19,341 and service receiver object 604 is responsible for $2,700 of the $19,341.

In various examples, ECA tab interface 510 includes ECA table 614. ECA table 614 may display the allocation values for service receivers linked to service provider object 520, with respect to service AR1234. ECA table 614 shows all the service receivers of service receivers group object 524—not just the filtered service receivers. An option may be presented in ECA tab interface 510 to show or hide rows of ECA table 614 dynamically based on the service receivers shown in graph presentation area 504. In various examples, if the option is enabled, rows corresponding to the service receivers shown in the graph presentation area 504 may be shown in the ECA table 614, and all other rows may be hidden. Thus, with respect to FIG. 6., if the option was enabled, ECA table 614 would only have three rows: service provider row 616, service receiver row 618, and service receiver row 620. It is appreciated that in other examples more or fewer rows than three may be shown (e.g., based on the number of service receivers shown in the graph presentation area 504). Report generation element 612 may generate a spreadsheet document that includes the information displayed by ECA table 614. In some examples, the spreadsheet document may include all of the information in ECA table 614, while in other examples the spreadsheet document may include the information only corresponding to the shown rows (e.g., excluding the information corresponding to the hidden rows).

In various examples, a row of ECA table 614 may include three columns (e.g., corresponding to column titles "LEGAL ENTITY", "MTD", and "YTD"). The first column may be the legal name of the entity ("LEGAL ENTITY"), the second column may include a month-to-date allocation value ("MTD"), and the third column may include a year-to-date allocation value ("YTD"). As seen in FIG. 6, in an example, the first row of ECA table 614 is for the service provider of graph presentation area 504, and each subsequent row is a respective service receiver. For instance, in FIG. 6, service provider row 616 has a first column value of "ACME-BANK-LONDON BRANCH", service receiver row 618 has a first column value of "BANK SECURITIES INDIA", service receiver row 620 has a first column value of "BANK SECURITIES EUROPE", and so on. The percentage in parentheses after each allocation value is with respect to the allocation value of the first row of the ECA table 614. As an example, the allocation value of MTD column of service receiver row 618 is $3,572 (18.5%) and indicates that value is 18.5% of the $19,341 of service provider row 616. The allocation value of MTD column of service receiver row 620 is $2,700 (14.0%) and indicates that the value is 14% of the $19,341 of service provider row 616. Similarly, in FIG. 6, the allocation value of YTD column of service receiver row 618 is $28,200 (17.5%) and indicates that the value is 17.5% of the $161,122 of service provider row 616.

An extra detail element 622 may also be included in one or more rows. Extra detail element 622 is illustrated as being at the end of a row but may be presented in other places without departing from the scope of this disclosure. As shown, in some examples, each row may have a corresponding additional detail element. When a user selects extra detail element 622, another row(s) may be displayed beneath the row in which extra detail element 622 appears. For example, if extra detail element 622 was activated, one or more additional rows would be displayed between service receiver row 618 and service receiver row 620. The number of additional rows provide a more granular view of what aspects of a service receiver are responsible for the allocation value. For example, there may be three sub-receivers for service receiver object 602 (e.g., represented by service receiver row 618). A sub-receiver row may include allocation values with respect to service receiver object 602.

Figure 7:
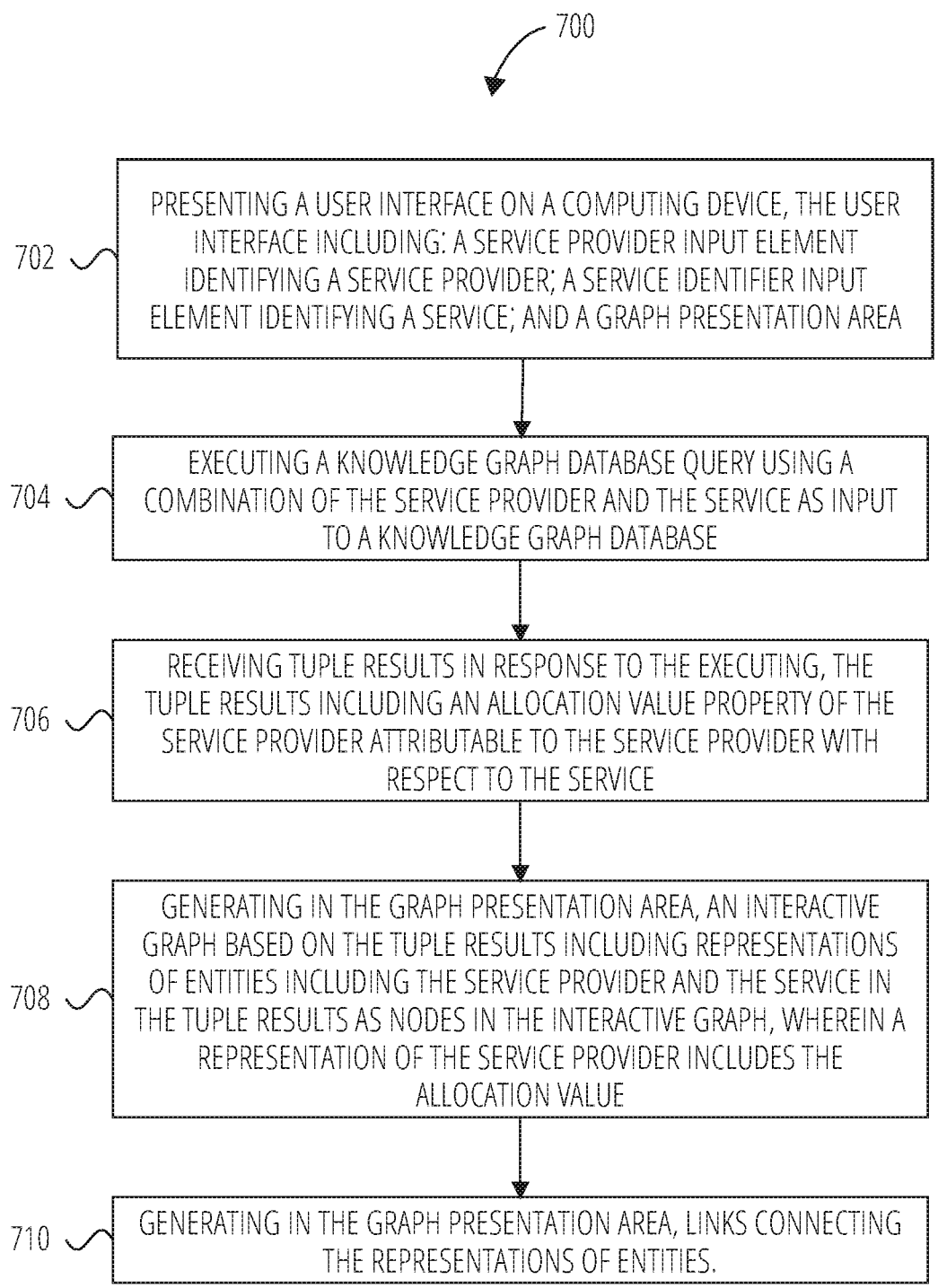
FIG. 7 is a flowchart illustrating a method for generating a knowledge graph visualization interface, according to various examples.

FIG. 7 is a flowchart illustrating a method for generating a knowledge graph visualization interface, according to various examples. The method is represented as a set of blocks that describe operations 702 to operation 710. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 7. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure According to various examples, the method includes presenting a user interface on a computing device, the user interface including: a service provider input element identifying a service provider; a service identifier input element identifying a service; and a graph presentation area at operation 702. According to various examples, the user interface may be one such as presented in FIG. 5 or FIG. 6. The service provider input may be one such as service provider input element 512. Similarly, the service identifier input element may be one such as service identifier input element 514. The graph presentation area may be one such as graph presentation area 504.

The method may further include presenting a contextual panel interface including a graph filtering portion configured to receive filter options with respect to child nodes of the selected representation of the entity. For example, the contextual panel interface may be one such as contextual panel interface 506 and the filter options may be filtering option controls 538.

According to various examples, the method includes executing a knowledge graph database query using a combination of the service provider and the service as input to a knowledge graph database at operation 704. For example, the executing may be performed using search component 328 using a graph database query language.

According to various examples, the method includes receiving tuple results in response to the executing, the tuple results including an allocation value property of the service provider attributable to the service provider with respect to the service at operation 706. In various examples, the allocation value is a first allocation value, and wherein the first allocation value covers a first period of time. The representation of the service provider may include a second allocation value covering a second period of time that is shorter than the first period of time and is a subset of the first period of time. For example, a month-to-date allocation value and year-to-date allocation value may be used. The values may be presented such as indicated service provider allocation value 606.

According to various examples, the method includes generating in the graph presentation area, an interactive graph based on the tuple results including representations of entities including the service provider and the service in the tuple results as nodes in the interactive graph, wherein a representation of the service provider includes the allocation value at operation 708.

For example, the interactive graph may be generated by visual graph generation component 326. The interactive graph may be one such as presented in graph presentation area 504 of FIG. 6. In various examples, the interactive graph further includes a representation of a service receiver group including a numerical indication of a number of service receivers connected to the service provider in the knowledge graph database based on the tuple results. For example, the numerical indication may be one such as child element count 528.

The method may further include receiving activation of the representation of the service receiver group. In various examples, the method may include in response to the activation, expanding the interactive graph to present service receiver nodes based on service receivers that are logically connected to the service provider in the knowledge graph database. For example, graph presentation area 504 may be updated from a view such as in FIG. 5 to one in FIG. 6. Service receiver nodes may further identify an allocation value attributable to the respective service receiver with respect to the service provider and service. For example, a value such as service receiver allocation value 608 may be presented.

In various examples, the method may further include presenting in the contextual panel interface, for each respective service receiver of the service receivers that are logically connected to the service provider: an allocation value attributable to the respective service receiver with respect to the service provider and service; and a percentage value based on the respective service receiver's allocation value compared to the allocation value of the service provider. For example, an interface such as ECA tab interface 510 may be presented with ECA table 614. According to various examples, the method includes generating in the graph presentation area, links connecting the representations of entities at operation 710 . . . .

Figure 8:
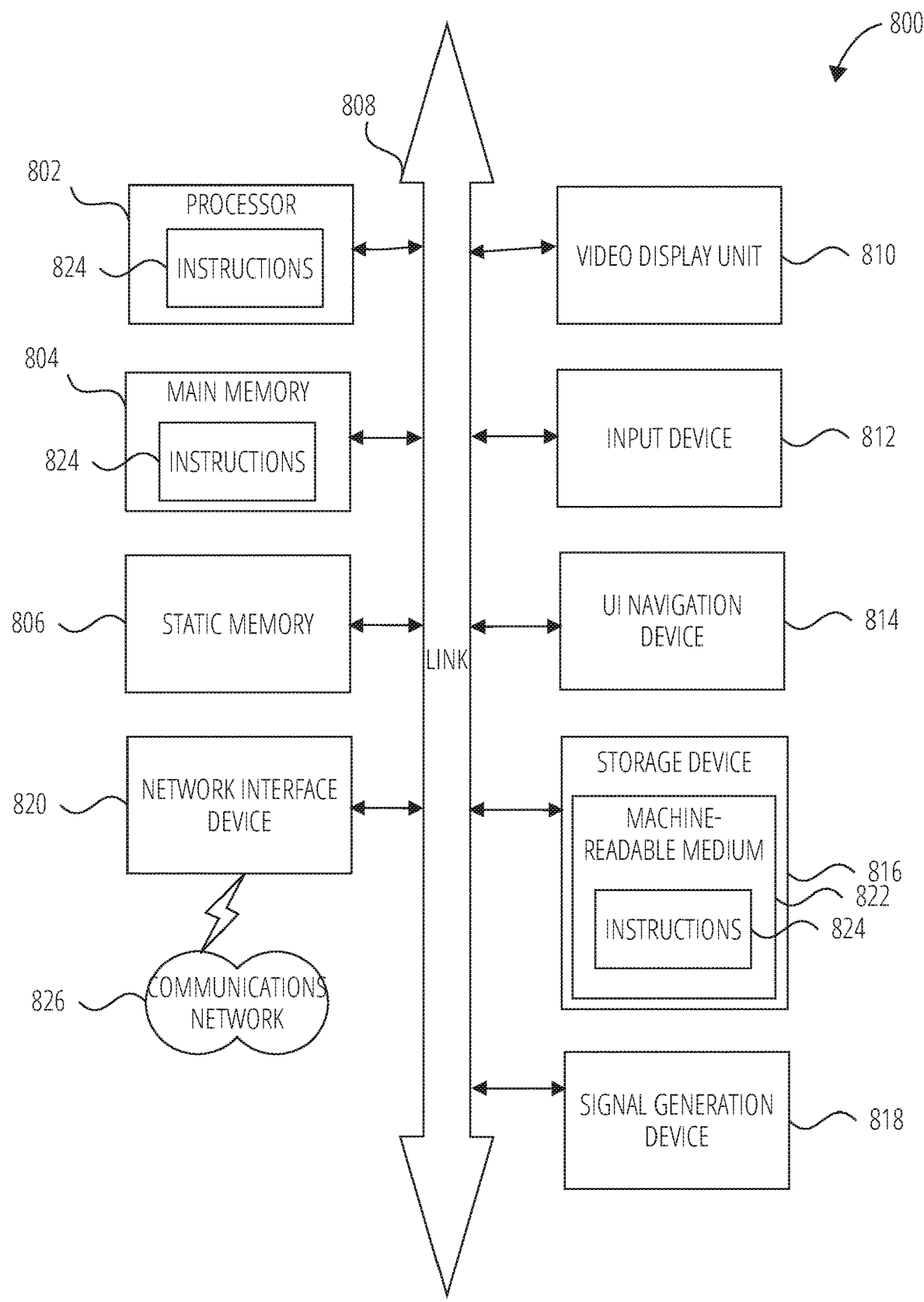
FIG. 8 is a block diagram illustrating a machine in the example form of computer system, within which a set or sequence of instructions may be executed to cause the machine to perform any one of the methodologies discussed herein, according to various examples.

FIG. 8 is a block diagram illustrating a machine in the example form of computer system 800, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808. The computer system 800 may further include a video display unit 810, an input device 812 (e.g., a keyboard), and a user interface (UI) navigation device 714 (e.g., a mouse). In one embodiment, the video display unit 810, input device 812, and UI navigation device 814 are incorporated into a single device housing such as a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, or other sensors.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed Database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 822 that excluded transitory signals.

The instructions 824 may further be transmitted or received over a communications network 826 using a transmission medium via the network interface device 820 utilizing any one of a number of well-known transfer protocols (e.g., HTTPS). Examples of communication networks include a local area Network (LAN), a wide area Network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
   presenting a user interface on a computing device, the user interface including:
      a service provider input element identifying a service provider;
      a service identifier input element identifying a service; and
      a graph presentation area;
   executing a knowledge graph database query using a combination of the service provider and the service as input to a knowledge graph database;
   receiving tuple results in response to the executing, the tuple results including a first allocation value of the service provider attributable to the service provider with respect to the service, the first allocation value covering a first period of time; and
   generating in the graph presentation area, an interactive graph based on the tuple results including:
      representations of entities including the service provider and the service in the tuple results as nodes in the interactive graph, wherein a representation of the service provider includes the first allocation value and a second allocation value covering a second period of time that is shorter than the first period of time and is a subset of the first period of time; and
      links connecting the representations of entities.

2. The method of claim 1, wherein presenting the user interface includes presenting a contextual panel interface, the contextual panel interface including:
   an entity details portion configured to present values of properties of a selected representation of an entity in the graph presentation area;
   a network graph selection type portion; and
   a graph filtering portion configured to receive filter options with respect to child nodes of the selected representation of the entity.

3. The method of claim 2, wherein the interactive graph further includes a representation of a service receiver group including a numerical indication of a number of service receivers connected to the service provider in the knowledge graph database based on the tuple results.

4. The method of claim 3, further comprising:
   receiving activation of the representation of the service receiver group; and
   in response to the activation, expanding the interactive graph to present service receiver nodes based on service receivers that are logically connected to the service provider in the knowledge graph database, wherein a respective service receiver node in the service receiver nodes identifies an allocation value attributable to the respective service receiver with respect to the service provider and service.

5. The method of claim 3, further comprising:
   presenting in the contextual panel interface, for each respective service receiver of the service receivers that are logically connected to the service provider:
      an allocation value attributable to the respective service receiver with respect to the service provider and service; and a percentage value based on the respective service receiver's allocation value compared to the allocation value of the service provider.

6. A non-transitory computer-readable medium comprising instructions, which when executed by a processing unit, configure the processing unit to perform operations comprising:
presenting a user interface on a computing device, the user interface including:
a service provider input element identifying a service provider;
a service identifier input element identifying a service; and
a graph presentation area;
executing a knowledge graph database query using a combination of the service provider and the service as input to a knowledge graph database;
receiving tuple results in response to the executing, the tuple results including a first allocation value of the service provider attributable to the service provider with respect to the service, the first allocation value covering a first period of time; and
generating in the graph presentation area, an interactive graph based on the tuple results including:
representations of entities including the service provider and the service in the tuple results as nodes in the interactive graph, wherein a representation of the service provider includes the first allocation value and a second allocation value covering a second period of time that is shorter than the first period of time and is a subset of the first period of time; and
links connecting the representations of entities.

7. The non-transitory computer-readable medium of claim 6, wherein presenting the user interface includes presenting a contextual panel interface, the contextual panel interface including:
an entity details portion configured to present values of properties of a selected representation of an entity in the graph presentation area;
a network graph selection type portion; and
a graph filtering portion configured to receive filter options with respect to child nodes of the selected representation of the entity.

8. The non-transitory computer-readable medium of claim 7, wherein the interactive graph further includes a representation of a service receiver group including a numerical indication of a number of service receivers connected to the service provider in the knowledge graph database based on the tuple results.

9. The non-transitory computer-readable medium of claim 8, wherein the instructions, which when executed by the processing unit, further configure the processing unit to perform operations comprising:
receiving activation of the representation of the service receiver group; and
in response to the activation, expanding the interactive graph to present service receiver nodes based on service receivers that are logically connected to the service provider in the knowledge graph database, wherein a respective service receiver node in the service receiver nodes identifies an allocation value attributable to the respective service receiver with respect to the service provider and service.

10. The non-transitory computer-readable medium of claim 8, wherein the instructions, which when executed by the processing unit, further configure the processing unit to perform operations comprising:
presenting in the contextual panel interface, for each respective service receiver of the service receivers that are logically connected to the service provider:
an allocation value attributable to the respective service receiver with respect to the service provider and service; and
a percentage value based on the respective service receiver's allocation value compared to the allocation value of the service provider.

11. A system comprising:
a processing unit; and
a storage device comprising instructions, which when executed by the processing unit, configure the processing unit to perform operations comprising:
presenting a user interface on a computing device, the user interface including:
a service provider input element identifying a service provider;
a service identifier input element identifying a service; and
a graph presentation area;
executing a knowledge graph database query using a combination of the service provider and the service as input to a knowledge graph database;
receiving tuple results in response to the executing, the tuple results including a first allocation value of the service provider attributable to the service provider with respect to the service, the first allocation value covering a first period of time; and
generating in the graph presentation area, an interactive graph based on the tuple results including:
representations of entities including the service provider and the service in the tuple results as nodes in the interactive graph, wherein a representation of the service provider includes the first allocation value and a second allocation value covering a second period of time that is shorter than the first period of time and is a subset of the first period of time; and
links connecting the representations of entities.

12. The system of claim 11, wherein presenting the user interface includes presenting a contextual panel interface, the contextual panel interface including:
an entity details portion configured to present values of properties of a selected representation of an entity in the graph presentation area;
a network graph selection type portion; and
a graph filtering portion configured to receive filter options with respect to child nodes of the selected representation of the entity.

13. The system of claim 12, wherein the interactive graph further includes a representation of a service receiver group including a numerical indication of a number of service receivers connected to the service provider in the knowledge graph database based on the tuple results.

14. The system of claim 13, wherein the instructions, which when executed by the processing unit, further configure the processing unit to perform operations comprising:
receiving activation of the representation of the service receiver group;
in response to the activation, expanding the interactive graph to present service receiver nodes based on service receivers that are logically connected to the service provider in the knowledge graph database, wherein a respective service receiver node in the service receiver nodes identifies an allocation value attributable to the respective service receiver with respect to the service provider and service.

\* \* \* \* \*